United States Patent [19]

Tamminen

[11] Patent Number: 4,521,497
[45] Date of Patent: Jun. 4, 1985

[54] ELECTROCHEMICAL GENERATORS AND METHOD FOR THE OPERATION THEREOF

[75] Inventor: Pentti J. Tamminen, Espoo, Finland

[73] Assignee: LTH Associates, Ltd., Cambridge, Mass.

[21] Appl. No.: 611,963

[22] Filed: May 18, 1984

[51] Int. Cl.³ .................................... H01M 2/00
[52] U.S. Cl. .................................. 429/27; 429/50; 429/69
[58] Field of Search .................. 429/27, 50, 51, 67, 429/68, 69, 70, 71, 72

[56] References Cited

U.S. PATENT DOCUMENTS

| | | | |
|---|---|---|---|
| 734,546 | 7/1903 | Halsey | 429/69 |
| 734,858 | 7/1903 | Halsey | 429/69 |
| 1,436,616 | 11/1922 | Walsh | 429/69 |
| 3,730,776 | 5/1973 | Geisler, Jr. | 429/51 |
| 3,822,149 | 7/1974 | Hale | 429/50 X |
| 3,985,581 | 10/1976 | Stachurski et al. | 429/51 |
| 4,147,839 | 4/1979 | Solomon et al. | 429/67 X |

*Primary Examiner*—Anthony Skapars
*Attorney, Agent, or Firm*—Hale and Dorr

[57] ABSTRACT

An electrochemical generator which utilizes the centrifugal force produced by rotating the electrodes (14, 19, 75, 76) of the generator and preferably the electrolyte to perform a variety of functions within the generator including circulation of the electrolyte past the electrodes, circulation of air past the gas electrode (14, 75) where the generator is a metal-gas generator, controlling dendrite growth and providing relatively dense uniform deposition of metal during recharge for a rechargeable metal-air generator, keeping electrolyte and reaction products away from the pores of a gas electrode to prevent flooding or clogging of the pores, separating reaction products from the electrolyte, maintaining uniform spacing between the electrodes as the metal electrode of a gas metal generator is consumed, flushing and draining electrolyte for standstill periods, maintaining good electrical contact between electrodes and their current collectors while still permitting easy replacement of consumed electrodes and automatically switching electrolyte flow and other functions when the generator changes from its discharging to its charging, flushing or draining state.

34 Claims, 12 Drawing Figures

ELECTROCHEMICAL GENERATORS AND METHOD FOR THE OPERATION THEREOF

BACKGROUND OF THE INVENTION

This invention relates to electrochemical generators such as galvanic primary and secondary batteries and fuel cells, and more particularly, to an improvement in such generators and in the method of using such generators which involves rotating the electrodes and other portions of the generator to provide a substantial centrifugal force and utilizing the centrifugal force to perform a variety of required generator functions.

Conventional electric batteries, such as the well-known lead acid battery, have both the electrodes and the electrolyte stationary with respect to the casing of the device. While such devies have been adequate for some applications, their energy density, defined as the total energy delivered by the battery system divided by the total weight of the system, has not been adequate for many applications and in particular as a power source for an electric car.

Batteries capable of generating much higher energy densities (in the order of two to ten times greater) include air-metal devices such as zinc-air and aluminum-air cells. However, a number of problems are encountered in connection with such devices which has limited their commercial potential. These problems include the need to circulate air past the air electrode requiring an external air pump. It is also necessary in these devices to circulate the electrolyte past the electrodes to inhibit dendrite formation during charging and to circulate crystallizing reaction products during discharge. This again requires some type of external pump, the air pump and the electrolyte pump adding to the overall weight of the system and thus reducing the energy density.

While circulating the electrolyte has reduced dendrite growth during recharging, it has by no means eliminated this problem, and it has not addressed the problem of uneven plating of the metal during recharge which tends to reduce the number of recharge cycles and therefore the useful life of the battery. In addition to the plating being uneven, the plated material is often spongy reducing the energy output of the device. Prior art devices which have used mechanical devices to shake, wipe or rub the electrode surfaces and/or have used one or more circular electrodes which are rotated about their center axis have also not completely solved these problems.

In addition, as the metal electrode is consumed during discharge, the spacing between the electrodes increases, reducing the efficiency and output of the generator. It is desirable to maintain this spacing uniform throughout the discharge cycle. Another problem with prior art generators of the metal air type is in preventing the electrolyte from flooding the pores of the gas electrode and in preventing reaction products from clogging these pores, the flooding or clogging of the pores inhibiting the flow of gas therethrough to the reaction zone. It has also been found that air electrodes can be destroyed in a relatively short time as a result anodic transfer combined with mechanical attacks caused by oxygen bubble formation during recharging of the battery. It is therefore desirable that electrolyte be kept out of contact with these electrodes during recharging. Other functions within the batteries which have required additional hardware in prior art batteries include draining of electrolyte for standstill periods, flushing of electrodes with water or neutralizing liquids for prolonged standstill periods and dispersing or removing oxygen and hydrogen bubbles from the electrolyte during operation. Separation and removal of reaction products from the electrolyte is still another problem which has required additional hardware in the prior art.

SUMMARY OF THE INVENTION

It has been found that many of the problems indicated above, and others, can be resolved, providing a relatively small, simple, easy to control and maintain, practical and reliable generator, by applying centrifugal force to the surfaces of the electrodes and to the electrolyte. This force may be utilized to perform a variety of functions including (a) circulating electrolyte, (b) for an air or other gas batteries, circulating the air or other gas, (c) inhibiting dendrite growth, (d) providing uniform and relatively dense plating of metal during recharging, (e) separating reaction products from the electrolyte, (f) controlling the spacing of the electrodes and (g) preventing the flooding and clogging of the pores of a gas electrode.

In particular, this invention provides an electrochemical generator having an anode electrode with at least one surface and a cathode electrode with at least one surface, the electrodes being mounted with their respective surfaces being in substantially parallel planes and spaced from each other by a predetermined distance. The space between the surfaces of the electrodes is filled with an electrolyte which is preferably stored in a suitable storage means. Means are provided for rotating the electrodes about an axis which does not intersect the electrodes. The storage means for the electrolyte is preferably also rotated about the same axis and means are provided which are operative at least in part in response to the rotation of the electrolyte for causing the electrolyte to circulate between the electrodes. The rotation of the electrodes causes a centrifugal force which is preferably substantially uniform over the surfaces of the electrodes to be applied thereto, this force being operative to inhibit dendrite growth on the electrodes during recharging and to cause the metal to be replated densely and evenly. The centrifugal force is also operative to separate crystallizing reaction products from the electrolyte. Where one of the electrodes is a gas electrode, means are also provided which are operative at least in part in response to the rotation and to the centrifugal force for causing a suitable gas, such as air, to be circulated past the surface of the gas electrode. The centrifugal force may also be utilized to control the spacing between electrodes and to perform other functions in the generator.

The foregoing and other objects, features and advantages of the invention will be apparent from the following more particular description of preferred embodiments of the invention as illustrated in the accompanying drawings.

DETAILED DESCRIPTION

Figure 1:
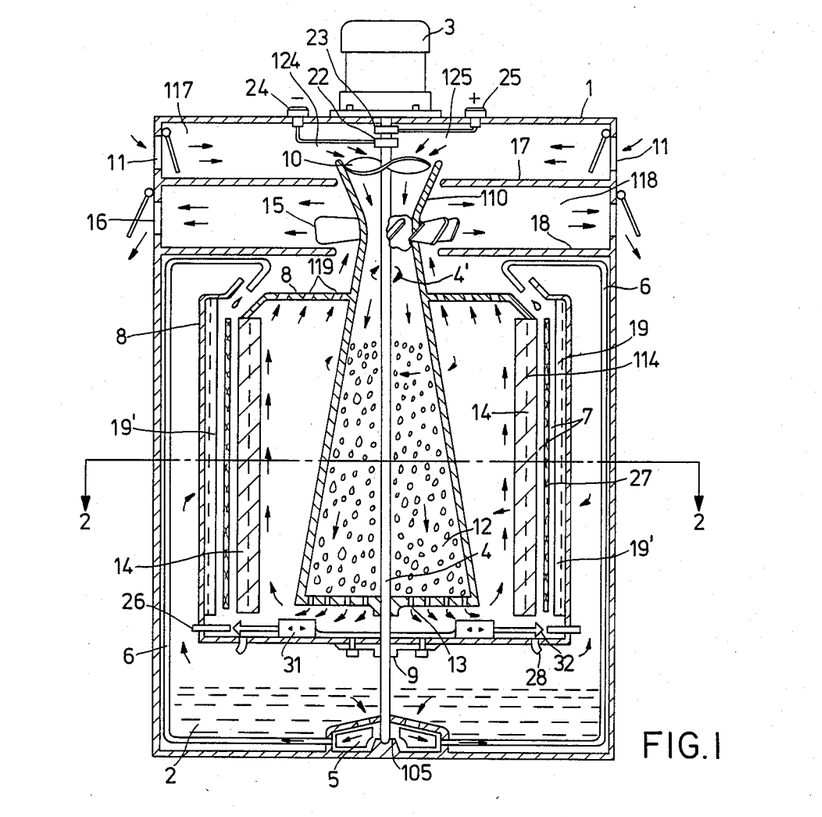
FIG. 1 is a vertical sectional view of an electrochemical generator of a first embodiment of the invention.
Figure 2:
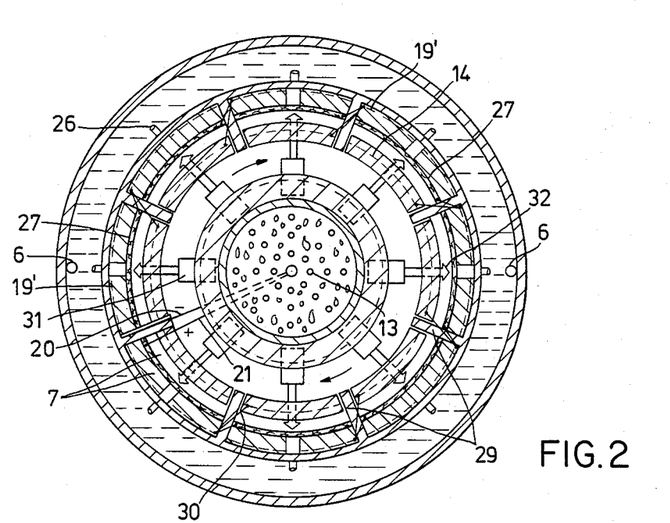
FIG. 2 is a horizontal sectional view of the embodiment of the invention shown FIG. 1 taken along the line 2—2.

FIGS. 1 and 2 illustrate a first embodiment of the invention which is a rechargeable zinc-air battery. The battery has a cylindrical container 1 with a motor 3 mounted on the center of its cover. The motor rotates a shaft 4 in the direction shown by arrows 4' the lower end of the shaft being supported in bearing 105 formed in the bottom of container 1. A centrifugal cylinder 8 is attached to shaft 4 at the lower side of the cylinder by a suitable fastening means 9. An hour-glass shape extension 110 projects from the top of cylinder 8 and is secured to the tips of blower blades 10 which blades are in turn secured to shaft 4. A plurality of blower blades 15 project from the throat of projection 110.

Cylinder 8 is divided into a plurality of individual cells by insulating walls 29, eight cells being provided for the embodiment of the invention shown in FIGS. 1 and 2. Each cell has an oxygen or air electrode 14 which may for example be formed of plastic-bonded activated carbon particles. Embedded within each electrode 14 is a current collector grid 114 which may for example be formed of nickel-coated steel. Each cell also has a charging electrode or grid 27 which may be formed of zinc and a negative nickel-coated steel electrode 19. At the back of each of the negative electrodes, next to the wall of centrifugal cylinder 8, there is a current collector 19' which is formed of a thin sheet or grid of a non-soluble material, such as nickel-coated steel.

A suitable liquid electrolyte, for example potassium hydroxide, is normally stored in the bottom area 2 of container 1. A centrifugal pump 5 operated by shaft 4 forces the electrolyte through pipes 6 to the spaces 7 between the electrodes. Since the pipes 6 are stationary, the rotation of cylinder 8 results in substantially equal quantities of electrolyte being provided to each of the cells. By making cylinder 8 slightly wider at its bottom than at its top, and having electrodes 19 and 27 angled substantially parallel to the wall of the cylinder, the electrolyte will flow from top to bottom through the spaces 7 as a result of the centrifugal force generated by the rotation of cylinder 8 regardless of the angle at which the container 1 is mounted. Thus, an "artificial gravity" is created, permitting the battery to be used in applications where its orientation cannot be controlled. Electrolyte flowing through the spaces 7 of a cell can exit the cylinder 8 either through a pipe 26 or a pipe 28 provided for each cell. The pipe 26 or 28 which is used is controlled by a separate electromagnetically operated valve 31 provided for each cell. The electrical control inputs for valves 31 are connected to the charging device of the battery (these connections not being shown in the figures) so as to be operated when the battery is being charged to cause plugs 32 to open pipes 26 permitting electrolyte to exit cylinder 8 through these pipes. The reason for this operation will be described later.

Baffles or plates 17 and 18 separate air intake area 117 and air exhaust area 118 from the remainder of the battery and from each other. Blower 10 causes air to be sucked into area 117 through openings 11 and through this area to carbon dioxide scrubber 12 surrounding shaft 4. The air passing through the scrubber exits through openings 13 and under the action of blowers 10 and 15 is drawn past air electrodes 14 and through openings 119 in the top of cylinder 8 and exhaust area 118 to exit openings or ports 16.

The cells of the battery are connected together in series by leads 30 which are best seen in FIG. 2. Charging electrodes 27 are connected to corresponding positive electrodes 14 in each cell. The insulated negative and positive leads, 21 and 22 respectively, from the electrodes are fed through a suitable opening in shaft 4 and are attached to respective slide rings 22 and 23 at the top of shaft 4 which rings are insulated from each other. The slide rings are electrically connected through suitable brush contacts and leads 124 and 125 to negative terminal 24 and positive terminal 25 respectively.

In operation, during discharge, the valves 31 are operated to plug pipes 26 permitting electrolyte to exit cylinder 8 only through pipes 28 and thus permitting electrolyte to completely fill the spaces 7 between electrodes 14 and 19. During discharge, the rotation of shaft 4 by motor 3 is operative in a manner previously described to cause both the circulation of electrolyte and of air. The rotation of cylinder 8 is at a rate to produce a centrifugal force which is preferably not less than 10 g's (i.e. 10 times the force of gravity) and is preferably in the range of 30 to 50 g's. This force assures that electrolyte will not come in contact with the air face of the gas electrode 14, thereby assuring that the pores of this electrode are not flooded and is also operative to force any reaction products formed at the air electrodes and in the electrolyte outwards towards the walls of cylinder 8 assuring that flooding and clogging of the pores of this electrode does not occur and that the oxygen supply to the depolarizing reaction zone is maintained. The centrifugal force also is operative to disburse any gas bubbles formed as a result of the discharging reaction and prevent these bubbles from lingering near the electrodes.

If it is desired to maintain a substantially uniformed spacing between the electrodes as the zinc electrode is consumed during discharge, porous plastic separator sheets may be provided in the area 7 and the air electrodes 14 may be mounted in a manner to be described in more detail in conjunction with the second embodiment of the invention so as to be movable toward the zinc electrode under action of the centrifugal force so that the space between the electrodes is maintained constant as the zinc electrode is consumed.

When the battery is being charged, the charging current activates the valves 31. Pipes 26 are therefore unplugged. The centrifugal force applied to the electrolyte in conjunction with the reduced quantity of electrolyte in area 7 resulting from the flow of electrolyte through pipes 26 results in electrolyte only existing in the spaces between electrodes 19 and 27 during charge and in no electrolyte being in contact with air electrode 14 during this operation. This prevents the potential destruction of the air electrode which can occur as a result of mechanical attacks on the air electrode when it is serving as an anode during recharging. During recharging, the rotation of shaft 4 also results in electrolyte and air flow as previously described and tends to concentrate reaction products required for replating of the zinc in the area of the zinc electrode.

A significant function of the rotation of cylinder 8, and a notable advantage of this invention, is that the rotation of the zinc electrode and the centrifugal force which is applied to the electrode as a result of such rotation effectively inhibits dendrite growth and results in a much more uniform and dense electrode plating during recharging than has previously been the case. In particular, two of the problems which have plagued prior art zinc-air and similar rechargeable metal-air batteries has been that, on recharge, dendrites form on the surface of the recharged zinc electrode which can be large enough to bridge the interelectrode gap resulting in short circuits. Even where short circuits do not occur, the deposition of the zinc tends to be soft and spongy and of uneven thickness. This can, after a number of rechargings, result in reduced output from the battery and ultimately render the battery unusable. With this invention, it has been found that by increasing the rotational speed of motor 3, and thus of centrifugal cylinder 8, to a speed which results in a centrifugal force of at least 100 g's, and up to 1000 g's, being applied to the surface of the zinc electrode, which force is substantially uniform over the plating surface of the electrode, dendrite formation is substantially eliminated and the zinc replates on the electrode in a substantially dense and uniform layer. At 100 g's, which may for a typical generator be achieved by rotating cylinder 8 at 800 rpm, it has been found that the apparent density of the deposited zinc is about 700, a level at which needle shaped dendrites or mossy deposits cannot grow. This results in the battery being usable through a significantly greater number of recharge cycles and therefore significantly enhances the useful life of the battery. Improved performance of the battery during its useful life is also obtained.

During the recharge cycle, energy for motor 3 is derived from the same source as the energy for recharging the battery. Even when the cylinder 8 is rotating at a rate to produce 1,000 g's centrifugal force, little energy is required to keep the system running once the initial standstill condition has been overcome, the additional energy being required primarily to overcome any effects of friction. Another energy consuming process is accelerating the electrolyte flowing through the cells to the velocity of the electrodes. The centrifugal force makes it possible to have a thin sheet of electrolyte homogeneously between the electrodes so that only a small trickle of additional electrolyte is sufficient to cause at the electrode surfaces the flow that is needed.

During discharge, motor 3 is started by an external source such as a small starting battery or a mechanical device such as a spring actuator. Once the battery is up to speed and producing output, the motor may be switched over to operate from the output of the generator and the output from the generator may also be utilized to recharge the starting battery. Typically, the motor 3 consumes only a very small fraction of the output from the generator. For example, the motor 3 of a zinc-air generator producing 20 kw may require only a 0.3 kw to operate motor 3. Batteries of the type shown in FIGS. 1 and 2 are capable of producing energy densities in the range of 200–400 wh/kg which makes them a realistic energy source for an electric car or other applications.

Figure 3:
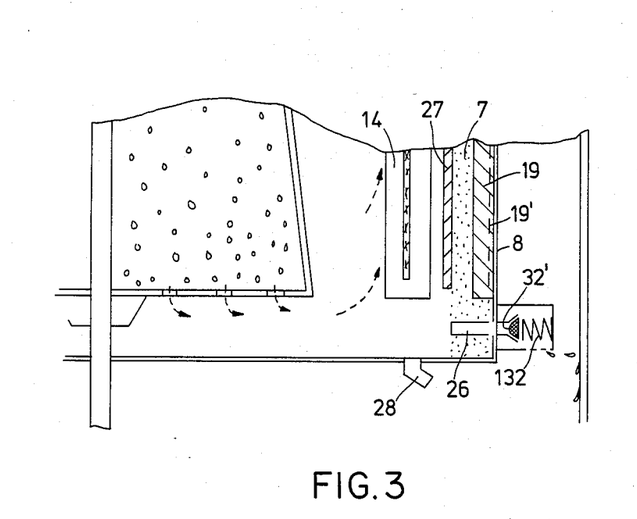
FIG. 3 is an enlarged sectional view illustrating a modification of the invention for the embodiment of the invention shown in FIG. 1.

FIG. 3 illustrates an alternative embodiment of the battery shown in FIG. 1 wherein advantage is taken of the fact that cylinder 8 is rotated at a higher speed during recharge than it is during discharge to simplify the plug control for pipes 26. In particular, in place of valves 31, the battery in the embodiment of FIG. 3 utilizes a plug 32' which is normally biased by a spring 132 to seal pipe 26. However, the centrifugal force applied to plug 32' when cylinder 8 is being rotated at a rate sufficient to produce in excess of 100 g's is sufficient to overcome the biasing effect of spring 132 and to thereby automatically open exhaust pipe 26. The electrolyte flow through different paths for charge and discharge can thus be controlled automatically without the need for electromagnetically operated valves.

ALTERNATIVE EMBODIMENT OF THE INVENTION

FIGS. 4–11 illustrate an alternative embodiment of the invention in the form of an aluminum-air battery. This generator is enclosed within a housing 40 having a cover 41, the housing containing all parts of the generator except for cell-flushing liquid storage. A cylinder 42 is rotated in housing 40 by a DC electric motor 43, the rotation of cylinder 42 being utilized to circulate electrolyte and air and to generate a centrifugal force which controls interelectrode spacing, removes crystallizing reaction products from the electrolyte, effects electrical contact to current collectors and drains and flushes the electrodes for standstill periods.

Figure 4:
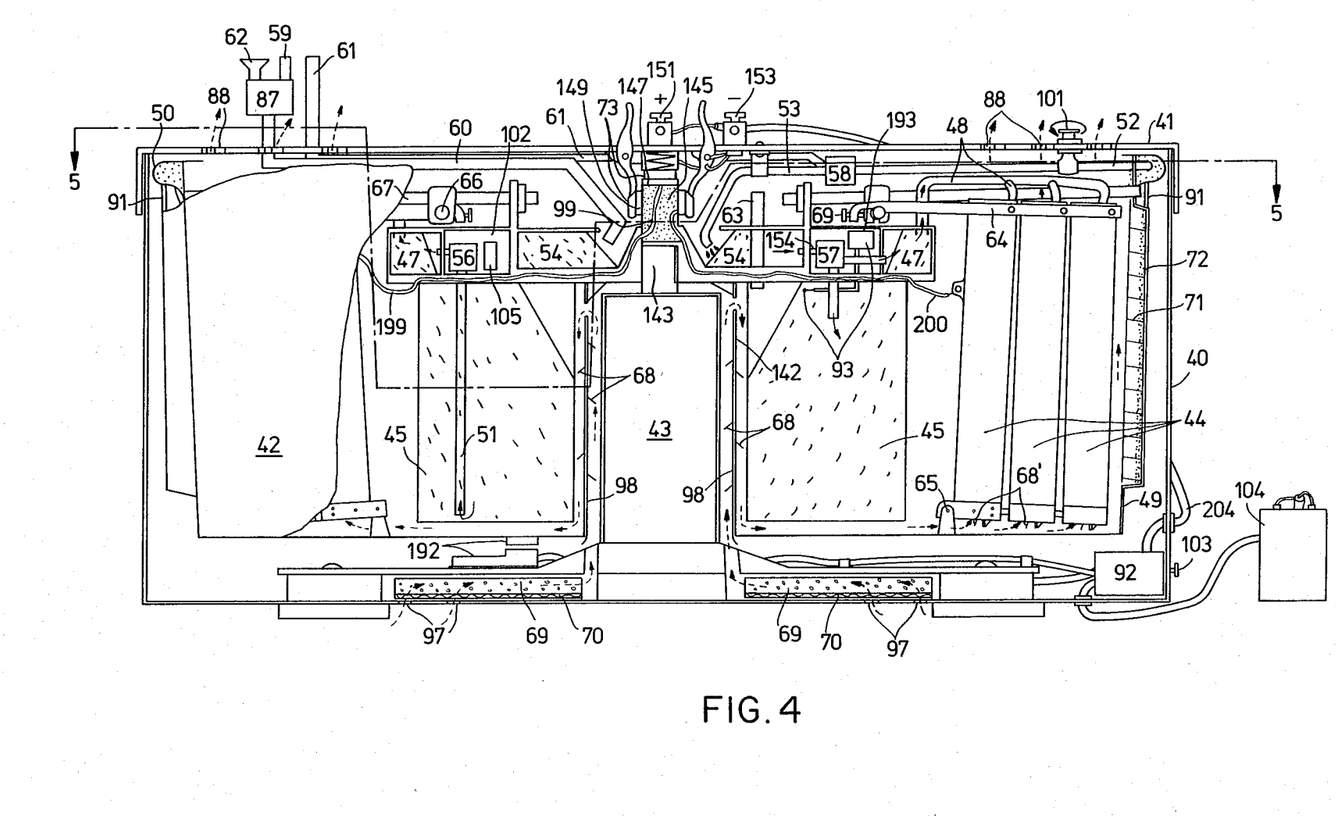
FIG. 4 is a vertical sectional view of a second embodiment of the invention.

More particularly, motor 43 rotates a shaft 143 to which cylinder 42 is secured by suitable means. Motor 43 is started by operating switch 103 of control device 92. When switch 103 is operated, control device 92 applies current from battery 104 to motor 43 to initiate operation of the generator. The rotational speed of cylinder 42 is detected by a suitable detector 192 which indicates to control device 92 when cylinder 42 reaches proper operating speed and which in conjunction with control device 92 controls the current applied to motor 43 to maintain its speed of rotation substantially constant during the remaining operation of the generator. The proper operating speed is a function of the desired centrifugal force and will vary with the size of the generator, being approximately 800 rpm for a typical generator. The centrifugal force generated should be at least 10 g's and preferably about 100 g 's. When the cylinder 42 is at proper speed, a centrifugal switch (not shown) causes current to be applied to magnetic valve 56, opening this valve to permit electrolyte from electrolyte storage cylinder 45 to flow through the valve into distribution cylinder chamber 47. From distribution chamber 47, the electrolyte flows under the influence of the centrifugal force of the rotating system through conduits 48 to electrochemical cells 44. The manner in which cells 44 operate will be described in some detail later. With electrolyte flowing, the generator starts to produce an output. When this output has reached a required level, control device 92 switches operation of motor 43 from battery 104 to the output from the generator itself applied to device 92 through line 204. Device 92 also utilizes some of the energy on line 204 to recharge battery 104.

Referring now to FIGS. 5–11, it is seen that the cells 44 are arranged in stacks of three cells each in twelve slightly wedge-shaped sectors. Because of the sector formation, each cell in a stack has a slightly different width. Each stack of the cells 44 is fixed to an insulating support beam 64 and is separated and insulated from the next stack by spacers 95 (See FIG. 6). The lower ends of the stacks are insulated and connected by hinges 65 to the bottom of cylinder 42. The support beams 64 are connected to support ring 66, which ring is clamped to four radial rods 67. The hinges 65 permit the stacks of cells to be listed at a desired angle under control of screws 96 in support beams 64. The reason for listing the stacks will be described later.

Each cell 44 is of substantially rectangular shape with back and side walls. Each cell has an air cathode 75 of conventional type mounted on a frame 74. A current collector of for example nickel-coated steel net is fastened to the cathode together with an insulating porous separator 81. These elements are supported by a holder 83 of an insulating material which is attached around slide pins 84 at both sides of cell 44, the slide pins 84 moving in slots 85 in the cell walls. As may be seen from FIGS. 7 and 8, when cylinder 42 is not rotating, the cathode assembly causes the pins to move to the position in the slots closest to the center of the generator, providing a space through which a consumed anode 76 may be removed and into which a new anode 76 may be inserted. When the cells are rotating, centrifugal force moves the cathode assembly to the position furthest from the center of the generator and into a position where cathode 75 with its current collector is separated from anode 76 only by the thickness of separator 81. The anode 76 is of aluminum, zinc or other suitable metal and is of conventional design. The current collector for anode 76 is for example a nickel plated steel sheet 77 fixed to the outer wall of cell 44 and having several cut out springy strips 77'. The strips 77' normally extend into the space between the anode current collector 77 and anode 76 (FIGS. 6 and 7) when cylinder 42 is not rotating. As may be seen in FIG. 7, this permits easy insertion and removal of anode electrode 76. When cylinder 42 is rotating, the cathode assembly presses anode 76 against strips 77' establishing good electrical contact between anode 76 and its current collector 77 with minimum contact resistance.

Figure 7:
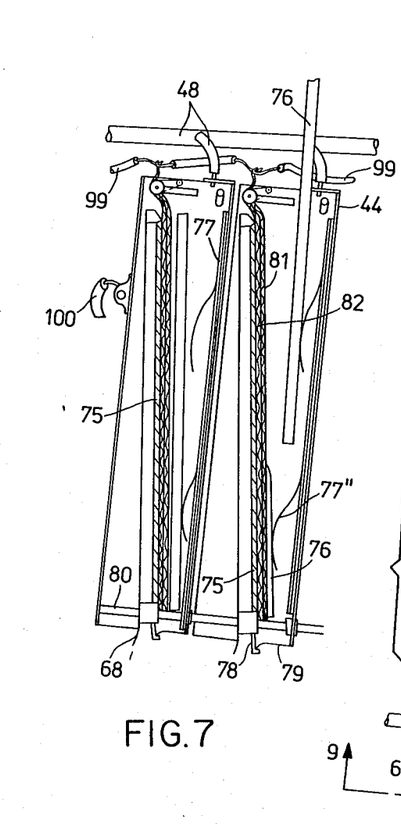
FIG. 7 is a vertical sectional view of two cells of the embodiment of the invention shown in FIG. 4 illustrating the refueling of the cells.

Thus it is seen that the generator can be easily mechanically recharged or refueled when the cylinder 92 is not being rotated by inserting new anode fuel plates 76 through the refueling slots 88 provided in cover 41 for each cell 44 and into the opening in front of collector 77' as shown in FIG. 7. Slots 88 have spring-hinged lids 88' which are normally automatically closed. A generator is therefore provided which may be easily refueled while still providing, as a result of the centrifugal force when the cylinder 42 is rotating, good electrical contact to the anode and a minimal controlled spacing between the electrodes.

The bottom element 79 of each of the cells 44 is of rubber. When the air cathodes 75 and their associated frames 74 are moved toward the anodes 76 as a result of the centrifugal force applied thereto, the pins 78 in the bottom of the frame 74 are pressing the edge of rubber sheet 79 (See FIG. 9) creating an opening of controlled size in the bottom of the cell. This forms an automatic system for controlling the level of electrolyte in the cells.

During discharge of the battery, electrolyte flows through conduits 48 into the space between cathodes 75 and anodes 76 of each cell. Electrolyte flows through the porous spacers 81 and through the opening formed in sheet 79 at the bottom of each cell. The electrolyte passing from the cells 44 is thrown by centrifugal force to the wall 49 of the rotating cylinder 42 and then rises up on this sloping wall as a result of the centrifugal force, passing through crystallizer 71 to the ring shaped container 50 at the top of the cylinder. Pipes may be provided at the ends of pins 78 to guide the thin stream of electrolyte from each cell past adjacent cells to wall 49. The crystallizer 71 comprises several removable segments positioned around the circumference of cylinder 42, the crystallizer preferably being a plastic grating with felt 72 on the bottom. The electrolyte will partly flow through the grating 71 and the felt 72 where the reaction products are trapped. The electrolyte penetrating the felt 72 will go to the ring container through the passage 91. The larger particles will be thrown to the grating 71.

From container 50, the electrolyte is picked up by the stationary wide-mouthed duck 52 which is substantially tangent at their ends to the direction of movement of the electrolyte in the container 50. Element 101 is provided to permit the depth and angle of the duct 52 to be adjusted in the channel 50. The electrolyte is fed through duct 52 and magnetic valve 58 to duct 53 which leads it to center cylinder 54. From center cylinder 54, it moves under the influence of centrifugal force through short pipe 154 and magnetic valve 57 to storage container 45, the cylinders 45, 47 and 54 being coaxial cylinders. The valves 57 and 58 are operated by the output voltage of the battery itself, obtained from controller 92, 193 or other suitable means.

Figure 8:
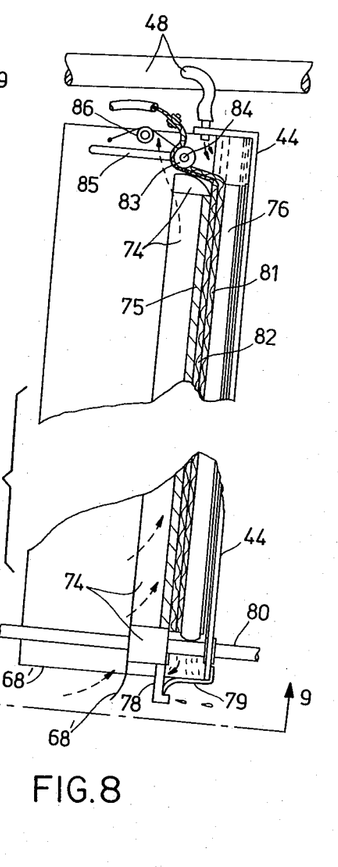
FIG. 8 is an enlarged vertical sectional view of a single cell of the embodiment of the invention shown in FIG. 4 during operation of the generator.
Figure 9:
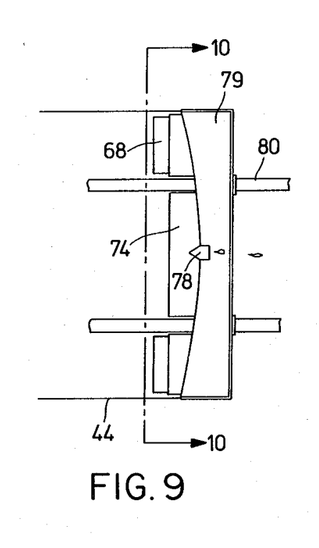
FIG. 9 is a bottom view of the cell shown in FIG. 8 taken along the line 9—9.
Figure 10:
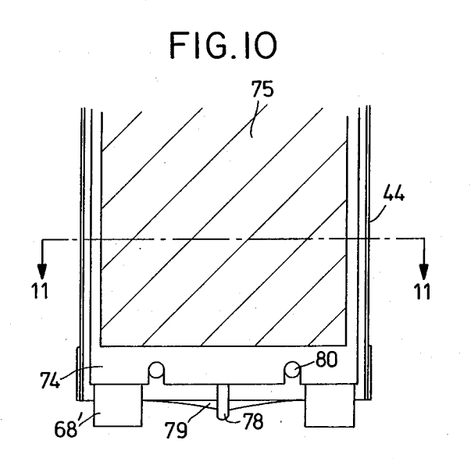
FIG. 10 is a front view of a portion of the cell shown in FIG. 8 taken along the line 10—10 of FIG. 9.
Figure 11:
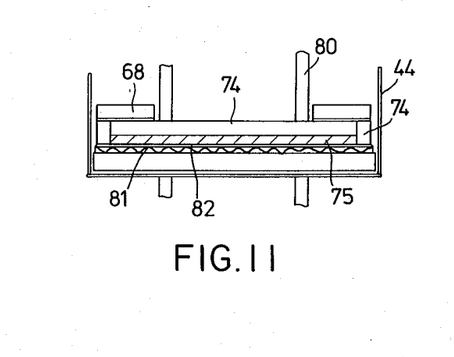
FIG. 11 is a top sectional view of the cell shown in FIG. 8 taken along the line 11—11 of FIG. 10.

During discharge, the metal anode electrode 76 is slowly consumed and therefore gets thinner. As this occurs, the interspace between the electrodes would normally increase. However, the centrifugal force applied to the cathode assembly is operative to move this assembly toward the anode against the separator to keep the space between the electrodes substantially constant at the thickness of the separator. As the cathode assembly moves toward the anode, pin 78 enlarges the opening in element 79 increasing the flow of electrolyte from the cell 44, thereby preventing the cathode from swimming deeper in the electrolyte and thus preventing the pores of the gas electrode 75 from flooding.

Figure 5:
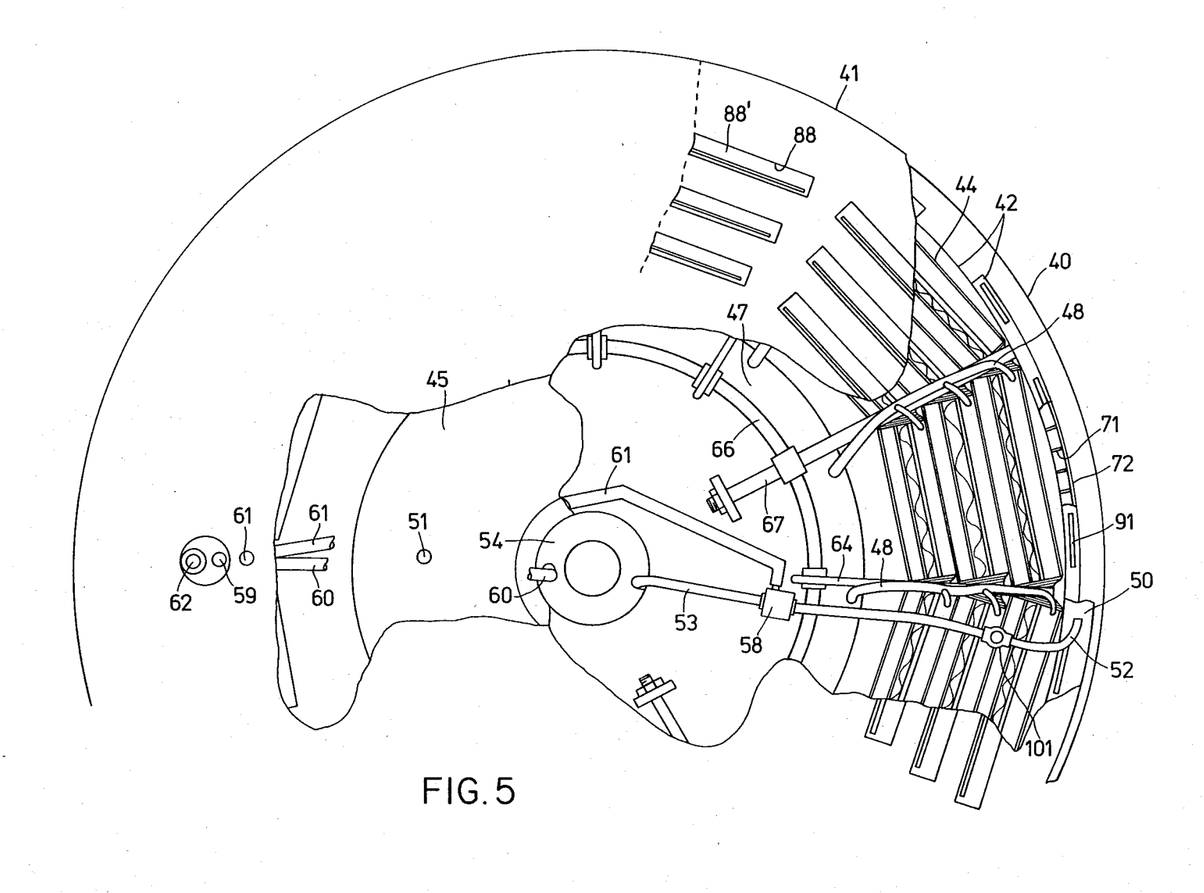
FIG. 5 is a horizontal sectional view taken along the line 5—5 of FIG. 4.
Figure 6:
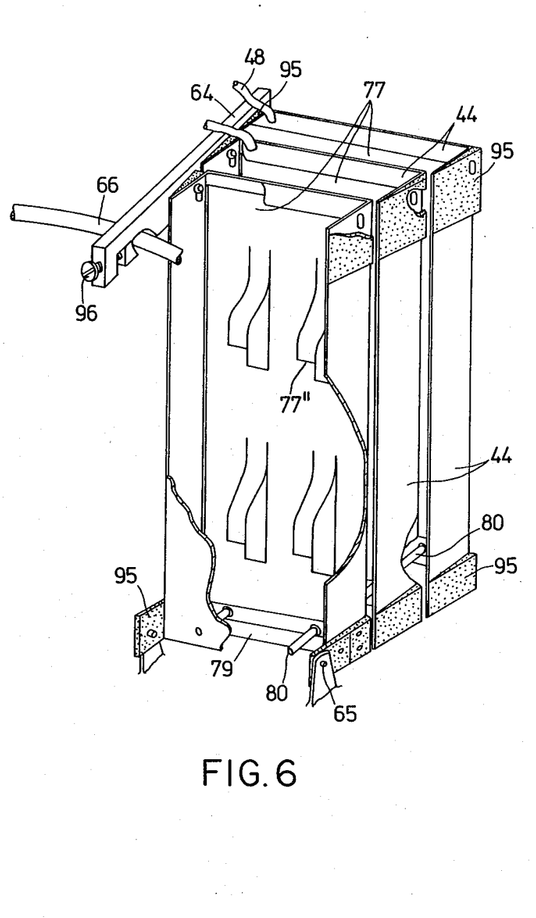
FIG. 6 is a partially cut away perspective view of three parallel connected cells for the embodiment of the invention shown in FIG. 4.

The electrolyte surface in cells 44 has a different angle as a result of the centrigual force applied thereto to the rotation axis depending on the rotation speed and on the distance of the cell from the rotation axis. The listing angle of the cells and of the electrodes therein should be adjusted so that they are substantially parallel to the electrolyte surface. This is achieved to some extent by the initial selection of the listing angle of each cell in the stack and by adjusting the listing angle of each stack for the selected rotation speed by use of screws 96.

Air for the air cathodes is obtained through air intakes 97 at the bottom of the generator. The air passes through a filter sheet 70 to remove dust, dirt and the like and through a scrubber 69 to remove carbon dioxide from the air. The air is then guided into the interspace between motor 43 and cylinder 40 to flush and cool the motor, a plurality of vanes 68 being provided in the interspace which are rotated with cylinder 42 and are operative to suck air into the generator. In the interspace between the inner wall 142 of cylinder 42 and storage tank 45, the air is again moved down by vanes 68 and is fed under the storage cylinder and under the cells toward the outer wall of cylinder 42. Vanes 68' are provided under the air cathode frames 74 of each cell to lead air up into the cells 44 to flush the surfaces of the air cathodes. The air stream, moving at least in part under the influence of the centrifugal force generated by the rotating cylinder 42, moves through the cells 44 and exits the cells and the generator through the outlets 89 and the refueling slots 88.

The anodes 76 of the cells are connected in parallel through the rods 80 in the bottom of cells 44. These rods also serve as the rails for the frames of the air cathodes 75. The electrical outputs from the cells are taken on insulated main conductors 199 and 200 which are lead through cavities under cylinders 47 and 54 and into the inside of a shaft 145 of insulating material mounted on the top of motor shaft 143. A positive slide plate 147 and a negative slide ring 149 are fixed to this shaft with the conductors 199 and 200 being respectively welded to the plate 147 and the ring 149. Sliding brushes insulated from cover 41 conduct the current to output terminals 151 and 153.

Thus, it is seen that the generator of this invention when in its discharge mode, utilizes the centrifugal force resulting from the rotation of cylinder 42 to perform a variety of functions including circulating electrolyte, circulating air, removing reaction products from the electrolyte, and maintaining a substantially uniform spacing between electrodes as the metal anode is consumed. The centrifugal force from the rotation of cylinder 42 can also be utilized to drain electrolyte from the electrode surfaces for standstill periods and for flushing the electrodes with water or neutralizing liquid for prolonged standstill periods.

For standstill periods, the cells 44 and the electrodes in them can be drained by cutting off power to the magnetic valve 56, thereby closing the valve to cut off the supply of electrolyte, while continuing to rotate the cylinder 42. To assure that electrolyte is drained, it is preferable that the cylinder 42 be rotated at a higher speed, for example 1000 rpm, during drainage then during discharge. Since, with electrolyte drained from between the electrodes, the generator will not provide an output, power for motor 43 during the drainage operation is obtained from battery 104. A control device 105 is provided to cut off current to valve 56 during drainage which device may, for example, be a centrifugal switch operated in response to the increased rotational speed of cylinder 42 during drainage. The centrifugal force causes the electrolyte to flow during drainage in accordance with the manner previously described through crystallizer 71, pipe 91, container 50, duct 52, valve 58, cylinder 54, and valve 57 to storage cylinder 45. In addition, the drying-out of the cells 44 may be facilitated by making at least one of the rails 80 hollow and providing a spring-loaded valve at the end of the rail (like valve 32' in FIG. 3) which opens in response to the increased rotational speed during drainage. When all of the electrolyte has been returned to cylinder 45, the generator may be turned off for a short standstill period.

However, the standing of electrolyte in cells 44 and on the electrodes will corrode the electrode surfaces when the cells are not being discharged. In order to avoid this, the cells and the electrode surfaces have to be flushed and any remaining electrolyte (now diluted by the flushing liquid) removed if the generator is to experience any prolonged standstill period. The liquid used for flushing the electrodes 75 and 76 is stored outside the generator. The flushing liquid is poured or otherwise caused to flow into central cylinder 54 through pipes 59 and 60. A chamber 87 is provided for the possible mixing of crystallizing seed in the flushing liquid. The crystallizing seeds, which may be added through inlet pipe 62, are, for example, $Al(OH)_3$ which promote the crystallization of $Al(OH)_3$ by providing a basis for crystal growth and thus facilitate the settling of the reaction product in the crystalizer.

Since during the operation of the generator a certain amount of water may evaporate from the electrolyte, it is desirable to replace this water, during the flushing operation and to thus maintain the centration of the electrolyte at a desired level. This can be accomplished during the flushing operation by initially leaving valve 57 set to cause the flushing liquid from chamber 54 to flow to electrolyte storage cylinder 45. When the liquid level control unit 93 in chamber 45 indicates that the fluid level in the chamber is at a desired level, meaning that all of the lost water has been replaced, control 193 causes valve 57 to close preventing further liquid from being fed to storage cylinder 45.

With the magnetic valve 57 set to prevent fluid from chamber 54 entering electrolyte storage cylinder 45, the flushing fluid is fed directly to chamber 47. From cylinder chamber 47, conduits 48 carry the flushing fluid under the influence of the centrifugal force to cells 44. After flushing the electrodes 75 and 76 in cells 44, the flushing liquid is thrown by the centrifugal force to wall 49 and up this wall in the manner previously described to ring container 50 from which it is lead by duct 52 to magnetic valve 58. During the flushing operation, this valve is initially set to direct the flushing liquid back through duct 53 to chamber 54.

During the flushing operation, motor 43 continues to run from the battery 104. As the electrolyte flowing in the cells 44 is diluted by the flushing liquid, the output from the generator continues to decrease. Valve 57 continues to direct flushing liquid through cylinder 47 to flush the electrodes in cells 44 until the output from the generator drops to a point where the current applied to valve 58 is no longer sufficient to operate this valve. Valve 58 then opens directing the flushing liquid through duct 61 to the external flushing liquid storage. Valve 58 is closed to direct fluid back to duct 53 when the generator again is providing an output.

When the flushing operation has been completed, a second draining operation commences, current from battery 104 being applied to operate motor 43 as described above. Valve 56 and 57 set to prevent electrolyte or flushing liquid from being applied to the cells 44 and cylinder 42 continue to be rotated for a period of time until all of the flushing liquid, including any diluted electrolyte remaining therein, has been drained from the generator.

Figure 12:
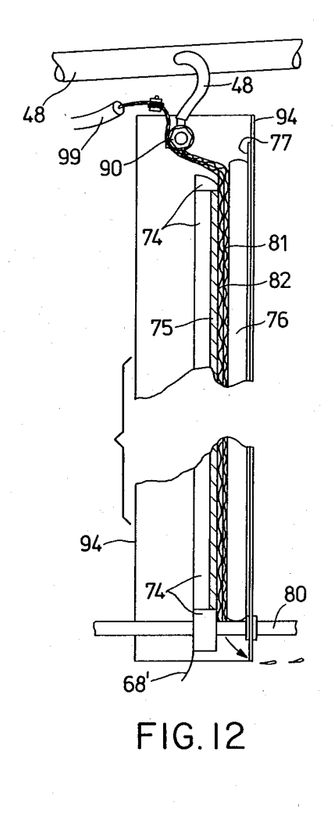
FIG. 12 is a enlarged vertical sectional view of a modified cell construction for the embodiment of the invention shown in FIG. 4.

FIG. 12 shows a slight modification of the invention in which the pin 78 and rubber sheet 79 have been replaced. Instead, the separator 81 is a thin porous web which has reasonably high resistance to the flow of electrolyte through it. The supporting holder 90 is a slotted pipe to which the conduit 48 brings the electrolyte. The electrolyte flows through the slotted pipe 90 and into the separator 81 which controls the flow of electrolyte. With this embodiment of the invention, the cells are listed with the top rather than the bottom of the cells nearer the center of the generator to facilitate electrolyte flow between the electrodes.

Refill pipe 63 is for filling storage cylinder 45 with electrolyte when the generator is first put into use or is otherwise in a standstill condition. A pipe of smaller diameter may be inserted through pipe 63 for this purpose. Pipe 63 also serves as a pressure equalizer for storage cylinder 45, allowing air to enter and leave following the movement of the electrolyte. To the extent the non-water portion of the elctrolyte, for example KOH, is lost during flushing or otherwise, it may be periodically replaced through pipe 63 or otherwise.

Periodically, gratings 71 with the entrapped reaction products, may be removed and replaced. It may be desirable to reclaim and recycle the reaction products.

While the invention has been described above with respect to preferred embodiments thereof, it will be apparent to those skilled in the art that the foregoing other changes in form and detail may be made therein without departing from the spirit and scope of the invention.

What is claimed is:

1. An electrochemical generator comprising:
   an anode electrode having at least one surface;
   a cathode electrode having at least one surface, said electrodes being mounted with their respective surfaces being in substantially parallel planes and spaced from each other by a predetermined distance;
   an electrolyte flowing between the surfaces of said electrodes; and
   means for rotating said electrodes about an axis and adapted to cause a substantial centrifugal force to be applied to at least one of said surfaces in a direction substantially perpendicular thereto.

2. A generator as claimed in claim 1 wherein said means for rotating is also operative to rotate said electrolyte; and
   including means operative at least in part in response to the rotaton of said electrolyte for causing said electrolyte to circulate through a predetermined path including in part the space between said electrodes.

3. A generator as claimed in claim 2 wherein said generator may be charged and discharged; and
   including control means responsive at least in part to the rotation of said electrolyte and operative to cause said electrolyte to have a different flow path on charge and discharge.

4. A generator as claimed in claim 3 wherein said means for rotating rotates faster during charge than during discharge; and
   wherein said control means includes a valve which is normally closed and is opened in response to the increased rotation speed of said means for rotating during charging of said generators to alter the flow path of said electrolyte.

5. A generator as claimed in claim 2 wherein the rotating of the electrolyte causes a centrifugal force to be applied thereto; and
   wherein said predetermined path is defined by at least one wall which is at an angle to the direction of said centrifugal force whereby said centrifugal force causes the electrolyte to flow in a predetermined direction along said wall.

6. A generator as claimed in claim 1 wherein one of said electrodes is a gas electrode; and
   including means, operative at least in part in response to said means for rotating for circulating a selected gas past said gas electrode.

7. A generator as claimed in claim 6 wherein said means for circulating gas includes blade means mounted for rotation by said means for rotating to circulate the gas past said gas electrode.

8. A generator as claimed in claim 6 wherein said gas is air; and
   wherein said means for circulating gas includes means for drawing air into said generator and means for exhausting the air from said generator.

9. A generator as claimed in claim 6 wherein said means for rotating includes an electric motor; and
   wherein said means for circulating gas includes means for circulating the gas past said motor to cool the motor.

10. A generator as claimed in claim 6 wherein said means for rotating causes a centrifugal force to be applied to said electrolyte, gas and electrodes which force prevents the electrolyte from flooding the pores of said gas electrode.

11. A generator as claimed in claim 1 wherein said generator is of a type which is charged and discharged; and
    wherein said means for rotating is adapted to rotate during charging at a rate sufficient to cause a centrifugal force of at least 100 g's to be applied to the surface of at least one of said electrodes.

12. A generator as claimed in claim 1 wherein said generator is of a type which is charged and discharged;
    wherein one of said electrodes is a metal electrode; and
    wherein said means for rotating causes a centrifugal force to be applied to said electrode during charging which prevents dendritic growth of deposited electrode metal.

13. A generator as claimed in claim 12 wherein said means for rotating is adapted to rotate during charging at a rate sufficient to cause a centrifugal force of at least 100 g's to be applied to the surface of at least one of said electrodes, whereby metal is plated on said electrode during charging in a relatively dense, uniform layer.

14. A generator as claimed in claim 1 wherein said means for rotating causes a centrifugal force to be applied to said electrolyte which causes separation of crystallizing reaction products from the electrolyte by centrifugal sedimentation.

15. A generator as claimed in claim 14 including means for trapping said separated reaction products.

16. A generator as claimed in claim 1 including means for mounting at least one of said electrodes for movement in a direction substantially perpendicular to the plane of its surface; and
    wherein said centrifugal force is adapted to move said electrode to control the spacing between the electrodes.

17. A generator as claimed in claim 16 including a separator of predetermined width positioned in the space between said electrodes, said centrifugal force being adapted to move the movable electrode toward the other electrode and against said separator, whereby a substantially uniform spacing may be maintained between said electrodes.

18. A generator as claimed in claim 1 wherein said anode is a zinc electrode and said cathode is an air electrode.

19. A generator as claimed in claim 1 wherein said anode is an aluminum electrode and said cathode is an air electrode.

20. A generator as claimed in claim 1 including at least one current collector element, said element including means operative at least in part in response to said means for rotating for making good electrical contact with one of said electrodes for collection of charge therefrom.

21. A generator as claimed in claim 1 wherein the centrifugal force applied to said electrodes is substantially uniform over the surface of electrodes.

22. A generator as claimed in claim 1 including means for detecting the rate at which said electrodes are being rotated by said means for rotating; and
    means responsive to said detection means for maintaining said rate substantially constant.

23. A generator as claimed in claim 1 wherein the anode electrode is a metal electrode which is consumed during the discharge of the generator; and
    including means operative during rotation of said electrodes by said rotating means for holding said anode electrode in place and operative when said electrodes are not being rotated for permitting a new anode electrode to be inserted.

24. A generator as claimed in claim 2 wherein said means for causing said electrolyte to circulate is included in part in a means for causing a flushing liquid to flow, at least in part in response to said means for rotating, between said electrodes; and
    including means for selecting whether said electrolyte or said flushing liquid will flow.

25. A generator as claimed in claim 24 wherein said flushing liquid is water; and
    including a storage tank for said electrolyte; and
    means for diverting part of said water, when water is flowing between said electrodes, to said storage tank to compensate for water lost from said electrolyte.

26. A generator as claimed in claim 2 including means operative prior to turning said generator off for terminating the flow of electrolyte to said electrodes and for continuing to operate said means for rotating, whereby said centrifugal force is operative to drain electrolyte from said electrodes.

27. A generator as claimed in claim 1 wherein said centrifugal force is at least ten times the force of gravity.

28. An electrochemical generator comprising:
    an anode electrode having at least one surface;
    a cathode electrode having at least one surface, said electrodes being mounted with their respective surfaces being in substantially parallel planes and spaced from each other by a predetermined distance;
    means for storing an electrolyte;
    means for rotating said electrodes and said means for storing about an axis which does not intersect said electrodes; and
    means responsive at least in part to said means for rotating for causing said electrolyte to circulate from said means for storing, between said electrodes, and back to said means for storing.

29. A generator as claimed in claim 28 wherein one of said electrodes is a gas electrode; and
    including means operative at least in part in response to said means for rotating for causing a selected gas to be circulated past said gas electrode.

30. A generator as claimed in claim 28 wherein said means for rotating causes a centrifugal force to be applied to said electrodes which force is substantially uniform over said surface of at least one of said electrodes.

31. A method of operating an electrochemical generator of the type having an anode electrode with at least one surface, a cathode electrode with at least one surface, said electrodes being mounted with their surfaces being in substantially parallel planes and spaced from each other by a predetermined distance, and an electrolyte in the space between said electrodes, comprising the steps of:
    rotating said electrodes and said electrolyte about an axis which does not intersect said electrodes at a rate sufficient to cause a substantial centrifugal force to be applied to said electrodes and said electrolyte; and
    utilizing said centrifugal force to circulate said electrolyte between said electrodes.

32. A method as claimed in claim 31 wherein one of said electrodes is an air electrode and including the step of utilizing said centrifugal force to cause air to flow past said air electrode.

33. A method as claimed in claim 32 wherein said generator is a rechargeable generator including the step of increasing the rate at which said electrodes and electrolytes are rotated, and therefore said centrifugal force, during charging of said generator; and
    utilizing the increased centrifugal force during charging to alter the flow path of the electrolyte to keep the electrolyte out of contact with the air electrode.

34. A method as claimed in claim 33 wherein one of said electrodes is a metal electrode which is subject to dendrite growth during recharging; and
    including the step of utilizing said centrifugal force to control dendrite growth.

* * * * *

UNITED STATES PATENT AND TRADEMARK OFFICE
CERTIFICATE OF CORRECTION

PATENT NO. : 4,521,497
DATED : June 4, 1985
INVENTOR(S) : Pentti J. Tamminen

It is certified that error appears in the above-identified patent and that said Letters Patent are hereby corrected as shown below:

Please replace Fig. 2 with the Figure shown below. Fig. 2 had been amended to indicate that lines 30 interconnect the electrodes 14 and 27 in each cell and extend from electrode 27 of one cell to electrode 19' of the adjacent cell in a clockwise direction.

FIG.2

Signed and Sealed this

Fifth Day of November 1985

[SEAL]

Attest:

DONALD J. QUIGG

Attesting Officer

Commissioner of Patents and Trademarks